US006217942B1

(12) United States Patent
Bolle et al.

(10) Patent No.: US 6,217,942 B1
(45) Date of Patent: Apr. 17, 2001

(54) LIGNIN BASED COATING

(75) Inventors: Rob Bolle, Zoetermeer; Wolfgang Aehle, Delfgauw, both of (NL)

(73) Assignee: Genencor International, Inc., Rochester, NY (US)

( * ) Notice: Subject to any disclaimer, the term of this patent is extended or adjusted under 35 U.S.C. 154(b) by 0 days.

(21) Appl. No.: 09/207,289

(22) Filed: Dec. 8, 1998

(51) Int. Cl.[7] .................................................. B05D 3/00
(52) U.S. Cl. .................................. 427/385.5; 427/388.1; 427/389.7; 427/393; 427/393.5; 427/393.6; 427/397; 530/500
(58) Field of Search .............................. 427/385.5, 388.1, 427/389.7, 393, 393.5, 393.6, 397; 530/500

(56) References Cited

U.S. PATENT DOCUMENTS

| 4,432,921 | 2/1984 | Haars et al. | 264/109 |
| 5,505,772 | 4/1996 | Kharazipour et al. | 106/163.1 |

FOREIGN PATENT DOCUMENTS

| 648 242 | 1/1994 | (EP). |
| 0 919 628 A1 | 6/1999 | (EP). |
| WO/93/23477 | 11/1993 | (WO). |
| WO/95/07604 | 3/1995 | (WO). |
| 9824890 * | 6/1998 | (WO). |
| WO 98/31729 | 7/1998 | (WO). |
| 9831728 * | 7/1998 | (WO). |
| WO/98/31728 | 7/1998 | (WO). |
| WO/98/31761 | 7/1998 | (WO). |
| WO/98/31762 | 7/1998 | (WO). |
| WO/98/31764 | 7/1998 | (WO). |
| WO98/31763 | 7/1998 | (WO). |

OTHER PUBLICATIONS translation of WO9831728, Jul. 1998.*

* cited by examiner

Primary Examiner—Erma Cameron
(74) Attorney, Agent, or Firm—Christopher L. Stone

(57) ABSTRACT

A method is provided for producing a coated article comprising: (a) preparing a solution of lignin; (b) mixing the lignin solution with a phenol oxidizing enzyme; (c) incubating the mixture from said step (b) under conditions and for a time sufficient to form a solution of a desired viscosity; (d) contacting or spreading the mixture from the step (c) on an article to be coated; and (e) allowing the coating to set onto the article by subjecting the article to conditions and for a time sufficient to form a coating on the surface of the article.

9 Claims, No Drawings

LIGNIN BASED COATING

BACKGROUND OF THE INVENTION

The present invention relates to methods for preparing coatings through enzymatic reactions with components of wood. More particularly, the present invention relates to the enzymatic polymerization of lignin based compositions with phenol oxidizing enzymes.

It has been estimated that nearly 20% of the chemical pulp and dissolving pulp provided worldwide is produced by the sulfite process. Moreover, the significance of this process has grown with the large-scale employment of modifiable magnesium bisulfite pulping. Nonetheless, although there exist a number of uses for lignin sulfonates produced by these processes, it has been difficult to find commercially feasible and desirable means of disposing of this large waste stream for useful purposes. As described in U.S. Pat. No. 4,432,921, the use of spent sulfite liquor as an adhesive for paper, wood and other lignocellulosic materials is well known in the art, and is facilitated by enzymatic activation of the lignin using a phenol oxidizing enzyme. U.S. Pat. No. 5,505,772 describes a method of preparing particle boards by conglutinating wood fragments having middle lamella lignin with a phenol oxidizing enzyme, the process having the advantage that it is necessary to add no additional binder. Further, it has been shown that laccase and other oxidoreductase enzymes, such as peroxidases, can be used as polymerization or curing catalysts for lignin (PCT Publication No. WO/98/31761; EP 648 242).

PCT Publication No. 93/23477 discloses the production of a solution or gel of lignin at high concentrations free of solids by treating the lignin at a high pH and then lowering the pH to a desired value. A binder can be made by subsequently treating with a phenolic oxidase.

PCT Publication No. 95/07604 discloses a method of producing fibreboard, the method comprising the sequential steps of (a) providing an aqueous slurry or suspension of lignin-containing wood fiber material; (b) adding a phenol oxidizing system to the fiber slurry; (c) forming the fiber slurry into a mat of the wood fiber material; and (d) pressing the formed mat by applying heat and pressure to produce the fiberboard.

PCT Publication Nos. 98/31761, 98/31762, 98/31763 and 98/31764 further disclose lignin based adhesives and methods of producing such adhesives for the production of fiberboards.

PCT Publication No. 98/31728 discloses intermediates for the production of polymers from lignin derivatives from the pulp industry, produced by processing lignin derivatives with phenol oxidizing enzymes in the presence of oxidation agents. The invention is characterized in that the lignin derivatives are (a) subjected to enzyme treatment for more than 3 hours in the presence of air; (b) subjected to enzyme treatment for more than 10 minutes while air or oxygen is passed through them; or (c) are oxidized by treatment with chemical oxidation agents. The intermediate is used for the production of polymers of lignin derivatives from the pulp industry, of fiber reinforced duroplastic composite materials from plant fibers, of water proof papers and cardboards, as well as duroplastics from lignin derivatives.

Thus, there has been much activity in the field of using phenol oxidizing enzymes to produce adhesives from lignin. However, other uses of lignin and sulfite spent liquors are necessary to economically dispose of the large quantity of waste material produced by the pulp and paper industry.

SUMMARY OF THE INVENTION

It is an object of the present invention to provide for a method of producing a coating for use in the protection, beautifying or otherwise treating an object.

It is a further object of the invention to provide for a method of producing such a coating from the waste liquors produced by the pulp and paper industry.

According to the present invention, a method is provided for producing a coated article comprising: (a) preparing a solution of lignin; (b) mixing the lignin solution with a phenol oxidizing enzyme; (c) incubating the mixture from said step (b) under conditions and for a time sufficient to form a solution of a desired viscosity; (d) contacting or spreading the mixture from the step (c) on an article to be coated; and (e) allowing the film to set onto the article by subjecting the article to conditions and for a time sufficient to form a film on the surface of the article. In a preferred embodiment, the phenol oxidizing enzyme is a catechol oxidase, laccase, bilirubin oxidase, monophenol monooxygenase or peroxidase. Also preferably, the laccase is derived from Aspergillus, Bacillus, Neurospora, Podospora, Botrytis, Collybia, Fomes, Lentinus, Pleurotus, Trametes, Rhizoctonia, Coprinus, Psatyrella, Myceliophthora, Schytalidium, Phlebiaor Coriolus. Further preferably, the solution of lignin comprises lignin sulfonate. Also preferably, the lignin solution further comprises a copolymerization agent, for example, acrylic acid.

In another embodiment of the invention, a coated article is provided, wherein the coated article comprises a film comprising lignin and a phenol oxidizing enzyme.

In yet another embodiment of the invention, the coated article is not a lignocellulosic, wood or paper based product.

An advantage of the present invention is that it is possible to prepare a useful item, i.e., a coated article, from the waste product of the pulp and paper industry.

Yet another advantage of the present invention is that it is possible to produce a coated object using an environmentally safe process comprising enzymes and lignin.

Yet another advantage of the present invention is that it is possible to produce a coated object from lignin, wherein the coated object is not a lignocellulosic material or derivative there of itself.

DETAILED DESCRIPTION OF THE PREFERRED EMBODIMENTS

"Phenol Oxidase" means an enzyme system which is capable of using hydrogen peroxide or oxygen to oxidize oxygen containing phenolic groups. If the phenol oxidizing enzyme requires a source of hydrogen peroxide, the source may be hydrogen peroxide or hydrogen peroxide precursor for in situ production of hydrogen peroxide, e.g., percarbonate or perborate, or a hydrogen peroxide generating enzyme system, e.g., an oxidase and a substrate for the oxidase, or an amino acid oxidase and a suitable amino acid, or a peroxycarboxylic acid or a salt thereof Hydrogen peroxide may be added at the beginning of or during the process. If the phenol oxidizing enzyme requires oxygen, atmospheric oxygen is usually sufficient, or alternatively, oxygen or air can be added to the system by percolating oxygen gas through the mixture. Phenol oxidizing enzymes can be catechol oxidases (EC 1.10.3.1), laccases (EC1.10.3.2), bilirubin oxidases (EC 1.3.3.5), monophenol monooxygenases (EC 1.14.18.1) or peroxidases (EC 1.11.1.7). Laccases are especially preferred and are known from microbial and plant origins. Preferred microbial laccases are from fungi or bacteria and include those from Aspergillus, Bacillus, Neurospora, Podospora, Botrytis, Collybia, Fomes, Lentinus, Pleurotus, Trametes, Rhizoctonia, Coprinus, Psatyrella, Myceliophthora, Schytalidium, Phlebia and Coriolus. In a most preferred embodiment, the laccase is derived from *Trametes, Coprinus, Pleurotus, Stachybotrys* or *Coriolus*.

"Lignin solutions" means an aqueous solution of lignin. Generally, it is possible to obtain suitable lignin solutions from the effluent produced during the process of pulping wood fiber and the production of papers, particularly the spent sulfite liquors. Examples of suitable lignin solutions include lignin sulfonates (also known as lignin sulfonates and sulfite lignins) which are the product of sulfite pulping, kraft lignins (also called sulfate lignins) which are obtained via the kraft pulping process, and lignins obtained from other technologies using organic solvents or high pressure steam treatments to remove lignins from plants. However, one of ordinary skill in the art would recognize lignins which are suitable.

According to the process of the invention, the lignin solution is contacted with the phenol oxidizing enzyme system and contacted with the article to be coated. In practice, it is appropriate to incubate the lignin solution with the phenol oxidizing enzyme system for a time and under conditions sufficient to facilitate some polymerization of the lignin and develop a viscosity which is appropriate for the coating of the article. For example, it may be preferred in the event that a thick, textured coating is desired to allow the mixture to incubate for a longer time than if a thin coating is desired, prior to coating the article with the combined lignin and phenol oxidizing enzyme system solution. As suggested above, if a thick textured coating is desired, the viscosity of the solution should be permitted to become relatively greater such that in applying the solution to the article, the texture of, for example, the application brush, is permanently set into the coating. On the other hand, thin coatings would preferably start from a relatively less viscous solution of lignin and enzyme. Routine experimentation may be necessary to develop the precise timing and conditions to obtain the appropriate appearance of the coated article, however, such experimentation is well within the ability of one of ordinary skill in the art.

In any event, the incubation time will be dependent on the conditions under which the reaction takes place, including consideration of temperature, pH, concentration of lignin, concentration of phenol oxidizing enzyme and the presence or not of accelerator compounds which promote the activity of the phenol oxidizing enzyme system.

The concentration of lignin should be such as to facilitate polymerization of the lignin in a suitable amount to produce the coating and will be dependent to some extent on the concentration of enzyme used. For example, in a lower concentration of lignin, it may still be possible to produce a suitable coating by adding a relatively higher amount of phenol oxidizing enzyme system. Likewise, in a higher concentration of enzyme, it may be possible to obtain sufficient coating production with the addition of less phenol oxidizing enzyme system. Preferably, the concentration of lignin in solution is 10 g/l to 600 g/l, more preferably from 25 g/l to 400 g/l and most preferably from 50 g/l to 200 g/l.

In the process of the invention, the concentration of oxygen or hydrogen peroxide can be determined using routine methods as an appropriate concentration or amount to facilitate the polymerization of the lignin. The concentration of phenol oxidizing enzyme is that amount which is sufficient to form the coating as provided herein, and will depend on, for example, the activity of the enzyme and its performance characteristics, the types of lignin and other components in the mixture. Nonetheless, the concentration of the enzyme can be determined routinely by the worker of ordinary skill.

Generally, the temperature and pH will be dependent on the optimal conditions for the phenol oxidizing enzyme system. For example, where the phenol oxidizing enzyme system is from Trametes versicolor, the optimal pH is between 4.5 and 6.0 and the optimal temperature is from 15° C. to 40° C. Alternatively, where the phenol oxidizing enzyme system is a laccase from *Stachybotrys chartorum*, the optimal pH is between 6.5 and 8.0 and the optimal temperature is from 15° C. to 40° C. The time required for the coating to set will depend on whether conditions are optimal or not, but will generally be at least 1 minute, and will usually range depending on conditions from between 10 minutes and 10 hours.

Other components may be added to the mixture prior to the application of the coating to the article to accelerate the polymerization of the lignin. For example, mediators may be added to the mixture such as ABTS (2,2'-azino-bis(3-ethylbenzothiazoline-6-sulfonic acid)) or HOBT (1-hydroxybenzotriazole). Similarly, known mediators for use accelerating the activity of phenol oxidizing enzyme systems, for example in bleach compositions, may be used, see e.g., PCT Publication Nos. WO 96/12846 and WO 95/01426.

Where it is desired that the coating be waterproof, it is possible to add copolymerization agents to the lignin solution prior to the application of the coating to facilitate water impermeability of the coating once it is set on the article. For example, acrylic acid, cellulose, starch, pulp, other carbohydrates, and chemical monomers capable of forming a copolymerization product with lignin may be used as a copolymerization agent.

Articles suitable for coating using the invention provided herein include commonly coated articles such as wood, glass, plastics, metal, ceramics or other solid items capable of supporting the coating. An especially useful application of the present invention is with porous items for which it is desired to provide a sealing effect. Another especially useful application of the invention is due to the potential anti-microbial properties of the laccase enzyme in the mixture.

In one embodiment of the invention, using the present invention it is possible that the article to be coated may surprisingly not be comprised of a substantial portion of lignocellulosic material, wood or paper.

In order to further illustrate the present invention and advantages thereof, the following specific examples are given with the understanding that they are being offered to illustrate the present invention and should not be construed in any way as limiting its scope.

EXAMPLES

Calculation of ABTS (2,2'-azino-bis(3-ethylbenzothiazoline-6-sulfonic acid) Units Reagents:
50 mM Na acetate (pH 5.0): 1.5 ml
4.5 mM ABTS in water : 0.2 ml
Enzyme sample : 0.1 ml
Dilutions of the enzyme are made in McIlvaine buffer pH 5 (mixture of 50 mM citric acid and 100 mM $NaH_2PO_4$)
Conditions:
Wavelength : 420 nm
Time : 30 seconds
Temperature : 30° C.
Procedure:
Add 0.2 ml ABTS to 1.5 ml 50 mM Na acetate (pH 5.0) in a cuvette and equilibrate to 30° C. in a water bath. Transfer the cuvette to the thermostated cell holder of a spectrophotometer. Add the enzyme sample, mix the contents of the cuvette thoroughly and start measuring, using "auto rate assay". Read for 30 seconds, in 6 second intervals.
Calculation:

$$U/ml = (\Delta A_{420} \, nm/2) \, (\text{Dilution factor})$$

Reaction mixture A (using *Trametes villosa* laccase)
2 g of ligninsulfonic acid (sodium salt), available from Extrasynthése (Genay, France), is dissolved in 5 ml McIlvaine buffer pH 5 (mixture of 50 mM citric acid and 100 mM $Na_2HPO_4$ in water). To this solution 3.5 ml *Trametes vilfosa* laccase (470 ABTS units), 0.23 ml 1 M. citric acid and 0.12 ml water are added, giving a total volume of 10 ml at pH 5.5. (Optimum pH for this system)
Reaction mixture B (with *Stachybotrys chartarum* laccase)
2 g of ligninsulfonic acid (sodium salt), available from Extrasynthése (Genay, France), is dissolved in a mixture of 3.34 ml water and 5 ml. McIlvaine buffer pH 6 (mixture of 50 mM citric acid and 100 mM $Na_2HPO_4$ in water). To this mixture 0.165 ml of *Stachybotrys chartarum* laccase (140 ABTS units), 0.05 ml 1 M citric acid and 0.30 ml water are added, giving a total volume of 10 ml at pH 7. (Optimum pH for this system)
Experimental Procedure
2 ml of either reaction mixture A or B was placed in a glass reaction tube (outer diameter 1.6 cm, length 15 cm) The tube was dosed with a screw cap, placed in a rotary mixer (type Heidolph REAX 2) and rotated at a speed of 75 rpm giving end over end rotation of the reaction tube. The reaction mixture flowed along the walls of the tubes facilitating contact between the liquid film and the oxygen in the air. The reaction tubes were incubated in this manner, at 24° C. for 50 minutes the viscosity of the reaction mixture increases significantly after approximately 50 minutes. After the incubation period ended, the walls of the reaction tube were covered with a solid coating formed of a layer of polymerised lignin.

We claim:
1. A method for producing a coated article, which comprises the steps of:
   (a) preparing a solution of lignin, wherein said lignin solution further comprises a mediator;
   (b) mixing said lignin solution with a phenol oxidizing enzyme; said mediator capable of accelerating reaction of said lignin with said phenol oxidizing enzyme;
   (c) incubating said mixture from said step (b) under conditions and for a time sufficient to form a solution of a desired viscosity;
   (d) contacting or spreading said mixture from said step (c) on an article to be coated, thereby forming a film on said article; and
   (e) allowing said film to set onto said article by subjecting said article to conditions and for a time sufficient to form a coating on the surface of an article.

2. A method for producing a coated article, which comprises the steps of:
   (a) preparing a solution of lignin, wherein said lignin solution further comprises a copolymerization agent;
   (b) mixing said lignin solution with a phenol oxidizing enzyme;
   (c) incubating said mixture from said step (b) under conditions and for a time sufficient to form a solution of a desired viscosity;
   (d) contacting or spreading said mixture from said step (c) on an article to be coated, thereby forming a film on said article; and
   (e) allowing said film to set onto said article by subjecting said article to conditions and for a time sufficient to form a coating on the surface of an article.

3. The method of claim 2, wherein said copolymerization agent comprises acrylic acid.

4. A method for producing a coated article, which comprises the steps of:
   (a) preparing a solution of lignin;
   (b) mixing said lignin solution with a phenol oxidizing enzyme;
   (c) incubating said mixture from said step (b) under conditions and for a time sufficient to form a solution of a desired viscosity;
   (d) contacting or spreading said mixture from said step (c) on an article to be coated, wherein said article is comprised of wood, glass, plastic, metal or coated thereby forming a film on said article; and
   (e) allowing said film to set onto said article by subjecting said article to conditions and for a time sufficient to form a coating on the surface of an article.

5. The method of claim 4 wherein said article is comprised of glass, plastic, metal or ceramic.

6. A method for producing a coated article, which comprises the steps of:
   (a) preparing a solution of lignin;
   (b) mixing said lignin solution with a phenol oxidizing enzyme;
   (c incubating said mixture from said step (b) under conditions and for a time sufficient to form a solution of a desired viscosity;
   (d) contacting or spreading said mixture from said step (c) on an article to be coated, wherein said article is not comprised of lignocellulosic, wood or paper components, thereby forming a film on said article; and
   (e) allowing said film to set onto said article by subjecting said article to conditions and for a time sufficient to form a coating on the surface of an article.

7. A method for producing a coated article, comprising the steps of:
   (a) providing an article having an exposed surface region, wherein said exposed surface region of step (a) does not include any lignocellulosic, wood or paper components;
   (b) preparing a solution of lignin;
   (c) mixing said lignin solution with a phenol oxidizing enzyme;
   (d) incubating said mixture from step (c) under conditions and for a time sufficient to form a solution of a desired viscosity;
   (e) contacting or spreading said mixture from step (c) on said exposed surface region, thereby forming a film thereon; and
   (f) allowing said film to set by subjecting said film and surface region to conditions and for a time sufficient to form a coating on said surface region.

8. The method of claim 7 wherein said exposed surface region is comprised of glass, plastic, metal or ceramic.

9. A method for producing a coated article, comprising the steps of:
   (a) providing an article having an exposed surface region;
   (b) preparing a solution of lignin, wherein said lignin solution further comprises a copolymerization agent;
   (c) mixing said lignin solution with a phenol oxidizing enzyme;
   (d) incubating said mixture from step (c) under conditions and for a time sufficient to form a solution of a desired viscosity;
   (e) contacting or spreading said mixture from step (c) on said exposed surface region, thereby forming a film thereon; and
   (f) allowing said film to set by subjecting said film and surface region to conditions and for a time sufficient to form a coating on said surface region.

* * * * *